UNITED STATES PATENT OFFICE.

ERNST ULRICHS, OF ELBERFELD, GERMANY, ASSIGNOR TO COMPANY "WÜLFING, DAHL & CO., ACTIENGESELLSCHAFT," OF BARMEN, GERMANY.

MANUFACTURE OF LAKES.

1,022,612.

Specification of Letters Patent.

Patented Apr. 9, 1912.

No Drawing.

Application filed August 15, 1911. Serial No. 644,116.

*To all whom it may concern:*

Be it known that I, ERNST ULRICHS, a subject of the King of Prussia, and resident of Elberfeld, Province of the Rhine, Germany, have invented certain new and useful Improvements in the Manufacture of Lakes, of which the following is a specification.

My invention consists in the production of new lakes which are of a beautiful red shade, being at the same time distinguished by their resistance to water and alcohol, their insolubility in oil, as well as by their high covering capacity and their excellent fast color as oil-colors.

The method of producing my new lakes consists in treating the monoazo dyes produced from diazotized ortho-toluidin and naphtholsulphonic acid 1.4 with a salt of the heavy metals as, for instance, calcium, barium and the like.

The dye produced from diazotized ortho-toluidin and naphtholsulphonic acid 1.4 is already known, but, being worthless for dyeing purposes, it has never been put on the market. Other monoazo dyes made from naphtholsulphonic acid 1.4 however are much used for dyeing wool, etc., while they are all unfit for the manufacture of lakes.

In making experiments in order to obtain good lakes I found that the lakes from the dye produced from diazotized ortho-toluidin and naphtholsulphonic acid 1.4, which I manufactured, are of excellent quality as oil-colors, while their very fast color against light is very astonishing. Furthermore I was surprised by the fast color of my lakes because in the German Patent No. 167,497, which describes lakes made from the dyes produced from diazotized ortho-toluidin and naphtholsulphonic acid 1.5 and from diazotized ortho-anisidin and naphtholsulphonic acid 1.5 it is asserted that the azo dyes produced from other naphtholsulphonic acids, as for instance, naphtholsulphonic acid 1.4, 1.3, 1.6 or 1.7 instead of naphtholsulphonic acid 1.5 as well as the azo dyes, having as one compound para-phenetidin, para-anisidin, para- and meta-toluidin meta- and para-xylidin, anilin or kresidin instead of ortho-toluidin or ortho-anisidin, yield lakes which are not fast against light. Contrary to this statement I found that my new lakes made from the dyes produced from diazotized ortho-toluidin and naphtholsulphonic acid 1.4 yield oil-colors which are very fast against light, and which even surpass the oil-color lakes made according to the abovementioned German patent.

My new lakes are obtained by producing the dye from diazotized ortho-toluidin and naphtholsulphonic acid 1.4 and in then using the usual methods in order to obtain color-lakes from the dye, *e. g.* as follows:—

Example I: A paste containing 3 kg. of the dry dye produced from diazotized ortho-toluidin and naphtholsulphonic acid 1.4 by known methods, is carefully stirred with 100 kg. of heavy spar suspended in water. A solution of ½ kg. of calcium chlorid is added and boiled for a few minutes. The color lake thus obtained is of a nice and clear orange-red shade, insoluble in water, alcohol and oil, and the oil colors made from it are of an excellent covering capacity and their resistance against the action of light is extraordinary.

Example II: This process is carried out exactly as in Example I but instead of using calcium chlorid, 1 kg. of barium chlorid is used. The color lake obtained by this method is of a bluish-red shade.

The color-lakes obtained in both cases are characterized by a beautiful and clear shade, by their resistance to water and alcohol, their insolubility in oil, and the oil colors made from them are very fast against light, being at the same time of an excellent covering capacity.

In manufacturing my new lakes by the above processes, instead of heavy spar, other substrata employed for color-lakes such as aluminium hydroxid, blanc fixe, etc., may be used. The manufacture of my new lakes may also be carried on under such conditions that the dyes form simultaneously with the precipitation of the lakes, as described in United States Patent No. 910,030.

I claim:—

1. A process for the manufacture of color-lakes, which consists in treating the dye produced from diazotized ortho-toluidin and naphtholsulphonic acid 1.4 with salts of heavy metals.

2. A process for the manufacture of color-lakes, which consists in treating the dye produced from diazotized ortho-toluidin and naphtholsulphonic acid 1.4 with a calcium salt.

3. As new articles of manufacture, color-lakes obtained from the dye produced from diazotized ortho-toluidin and naphtholsulphonic acid 1.4, characterized by their orange-red shade, their resistance to water and alcohol, their insolubility in oil, and their fast color against the action of light, yielding upon reduction by means of tin and hydrochloric acid, ortho-toluidin and 2 amido-naphtholsulphonic acid 1.4.

4. As a new article of manufacture, a color-lake obtained from the calcium salt of the dye produced from diazotized ortho-toluidin and naphtholsulphonic acid 1.4, characterized by its orange-red shade, its resistance to water and alcohol, its insolubility in oil and its fast color against the action of light, yielding upon reduction by means of tin and hydrochloric acid, ortho-toluidin and 2 amido-naphtholsulphonic acid 1.4.

In witness whereof I have hereunto set my hand in the presence of two witnesses.

ERNST ULRICHS. [L. s.]

Witnesses:
CHAS. J. WRIGHT,
L. NUFER.